Sept. 25, 1951 R. J. HALL 2,569,165
WOBBLE PLATE FOR FISH LURES
Filed March 30, 1946

INVENTOR
Ralph J. Hall
BY Barthel & Bugbee
ATTORNEYS

Patented Sept. 25, 1951

2,569,165

UNITED STATES PATENT OFFICE 2,569,165

WOBBLE PLATE FOR FISH LURES

Ralph J. Hall, Howell, Mich., assignor to Millsite Tackle Company, Howell, Mich., a corporation of Michigan Application March 30, 1946, Serial No. 658,455

3 Claims. (Cl. 43—42.47)

1

This invention relates to artificial fish bait and in particular to plug types of fish baits.

One object of this invention is to provide a wobble plate adapted to be secured to a plug type of artificial fish bait, the wobble plate having louvers of novel configuration which cause the lure to wobble to and fro as it is drawn through the water.

Another object is to provide a wobble plate for an artificial fish bait as set forth in the preceding object, wherein the ends of the wobble plate extend slightly upward from the central upper edge thereof so as to provide wings whereby the wobbling effect of the bait is enhanced.

Another object is to provide a wobble plate for an artificial fish bait as set forth in the preceding objects, wherein the louvers and the inclined plate provide a gurgling noise when the bait is drawn through the water while it wobbles or rolls about its longitudinal axis, thereby attracting fish by the sound it produces.

Other objects and advantages of the invention will become apparent during the course of the following description of the accompanying drawings, wherein.

Figure 1:
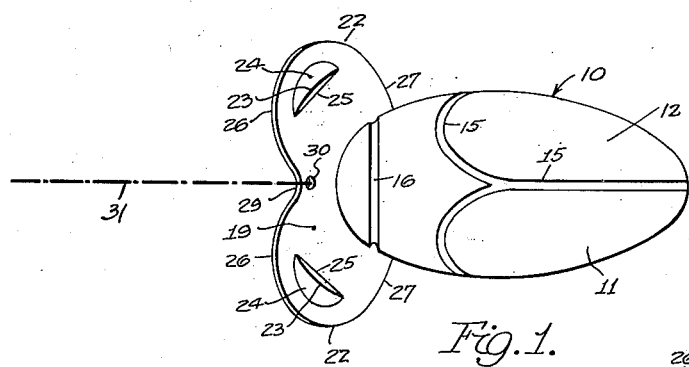
Figure 1 is a top plan view of an artificial fish bait according to a preferred embodiment of the invention.
Figure 3:
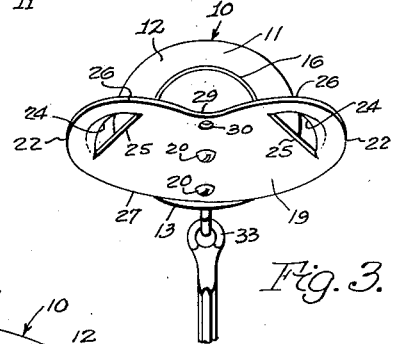
Figure 3 is a front elevation of the fish bait shown in Figures 1 and 2 with a portion of the hook omitted.
Figure 2:
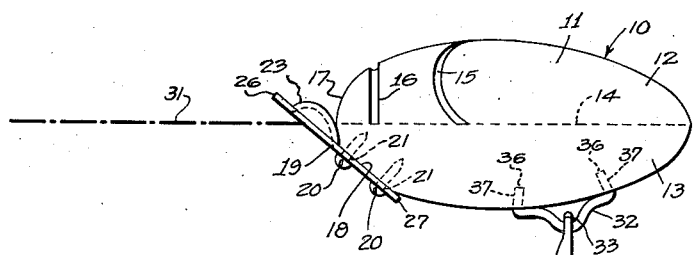
Figure 2 is a side elevation of a fish bait according to the embodiment shown in Figure 1.

Referring to the drawing in detail, the artificial fish bait 10, of this invention, consists of a body 11 of any suitable material, preferably synthetic plastic and preferably also hollow so as to float upon the water while it rests, or to remain slightly submerged, depending upon the loading of the body 11 relatively to its buoyant chambers. The body 11 is preferably made in halves 12 and 13 by well-known plastic injection molding processes and united by the use of a suitable adhesive along the junction plane 14. The body 11 may be provided with any suitable ornamentation, such as the Y-shaped groove portion 15 and the arcuate groove 16.

The body 11 near its forward end 17 is provided with an inclined flattened portion 18 to

2 which is secured a wobble plate 19, as by the fasteners 20, the body 11 being suitably thickened at that location to receive the shanks of the fasteners 20 through holes 21.

Figure 4:
Figure 4 is a top plan view of the wobble plate employed with the fish bait of Figures 1 to 3 inclusive.
Figure 4:
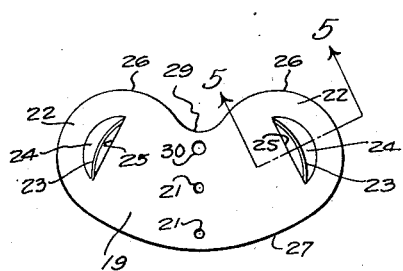
Figure 5:
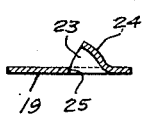
Figure 5 is a vertical section through one of the louvers and the adjacent portion of the wobble plate shown in Figure 4.

The wobble plate 19 is divided into a pair of outwardly extending wing portions 22 having convexo-concave louvers 24 (Figure 4) struck-up from the surface of the plate 19, leaving segmental apertures 25 therebeneath. These louvers 24 have lips 23 at their struck-up edges and are preferably inclined relatively to the vertical center line passing through the fastener holes 21—21. The wing portions 22 are extended upward to form the upper parts 26. The upper and lower parts 26 and 27 of the wobble plate 19 also preferably have edges (see Figure 4) arcuate, with a dip 29 between the portions 26 at the vertical center line of the wobble plate 19. A hole 30 for the attachment of a fishing line and/or swivel, diagrammatically indicated by the chain line 31, is provided immediately beneath the dip 29 in the edge of the plate 19 approximately on the center line passing through the fastener holes 21.

Secured to the body 11, as by a clip or bracket 32, is the eye 33 at the upper end of the shank 34 of a hook unit 35. The latter may consist of an individual hook or of a multiple hook assembly, as desired. The ends 36 of the clip or bracket 32 may be seated in holes 37 within the body 11 or a standard type of clip employing fasteners (not shown) may be used.

In the use of the invention, the fisherman casts the bait 10 and retrieves it in the usual manner. As the bait 10 is drawn through the water, the louvers 24 in the ends of the wobble plate 19 permit the water to pass through the apertures 25 while being deflected by the struck-up portions adjacent the lips 23. This action causes the wobble plate 19 and the body 11 attached to it to wobble or rock to and fro, oscillating about the longitudinal axis of the body 11. This action results in part from the fact that the louvers 24 are located remote from the center line through the holes 21 and 30, thereby producing a leverage effect upon the body 11. The inclination of the louvers 24 relatively to the center line of the wobble plate through the holes 21 and 30 increases the wobble action as the bait is drawn through the water. The passage of the water through the apertures 25 of the louvers 24 also produces a gurgling sound which serves to attract fish, since the hearing organs of many fish are considered by some experts to be more sensitive than their organs of vision.

While I have shown and described my invention in detail, it is to be understood that the same is to be limited only by the appended claims, for many changes may be made without departing from the spirit and scope of my invention.

What I claim is:

1. A wobble plate adapted to be secured to an artificial fish bait comprising a plate having spaced louvers with projecting lips inclined relatively to the vertical center line of said plate and disposed near the opposite lateral edges thereof.

2. A wobble plate adapted to be secured to an artificial fish bait comprising a plate having spaced louvers with projecting lips over openings disposed near the opposite lateral edges thereof, said louvers being convexo-concave and struck up from the upper surface of said plate.

3. A wobble plate adapted to be secured to an artificial fish bait comprising a plate having upwardly-extending wing portions on its upper edge with a central indentation therebetween and having spaced louvers with projecting lips over openings disposed near the opposite lateral edges thereof.

RALPH J. HALL.

REFERENCES CITED

The following references are of record in the file of this patent:

UNITED STATES PATENTS

| Number | Name | Date |
|---|---|---|
| 233,377 | Schwartz | Oct. 19, 1880 |
| 1,333,154 | Buddle | Mar. 9, 1920 |
| 1,341,618 | Medley | May 25, 1920 |
| 1,558,249 | DeZeng | Oct. 20, 1925 |
| 1,846,355 | Pemberton | Feb. 23, 1932 |
| 1,956,783 | Yeo | May 1, 1934 |
| 2,001,055 | De Witt | May 14, 1935 |
| 2,207,425 | Arbogast | July 9, 1940 |
| 2,235,905 | Sherwood | Mar. 25, 1941 |
| 2,270,487 | Withey | Jan. 20, 1942 |